United States Patent [19]

Nordmark

[11] 4,129,310
[45] Dec. 12, 1978

[54] HYDRAULIC HEELING STABILIZERS

[76] Inventor: Mikal Nordmark, 4062 Klepp stasjon, Norway

[21] Appl. No.: 792,627

[22] Filed: May 2, 1977

[51] Int. Cl.² ............................................. B60G 17/04
[52] U.S. Cl. .................................... 280/6 H; 280/710
[58] Field of Search .............. 280/6 R, 6 H, 6.1, 6.11, 280/112 A, 112 R, 710, 712, 715

[56] References Cited
U.S. PATENT DOCUMENTS

| | | | |
|---|---|---|---|
| 2,110,809 | 3/1938 | Murphy | 280/112 |
| 2,616,713 | 11/1952 | Echofield | 280/6 |

FOREIGN PATENT DOCUMENTS 1396890  6/1975  United Kingdom.

*Primary Examiner*—Philip Goodman
*Attorney, Agent, or Firm*—Ladas, Parry, Von Gehr, Goldsmith & Deschamps

[57] ABSTRACT

Hydraulic heeling or tilting stabilizer for a vehicle which comprises two individual pressure medium cylinders adapted to be mounted one on each side of a longitudinal central plane through the vehicle. A valve arrangement for controlling the supply of pressure medium to the cylinders and a swinging pendulum for actuating the valve arrangement. The valve arrangement is in the form of two separate control valves each associated with a respective one of the pressure medium cylinders and serving to couple the cylinders in parallel in a common pressure medium circuit. The cylinders are adapted for arrangement between a vehicle frame and a leaf spring-controlled wheel shaft to permit in the unactivated condition thereof separate springing of the vehicle via respective leaf springs. Activation of one cylinder leaves the other unactivated and causes a portion of the former to form a support between the frame and the shaft.

4 Claims, 3 Drawing Figures

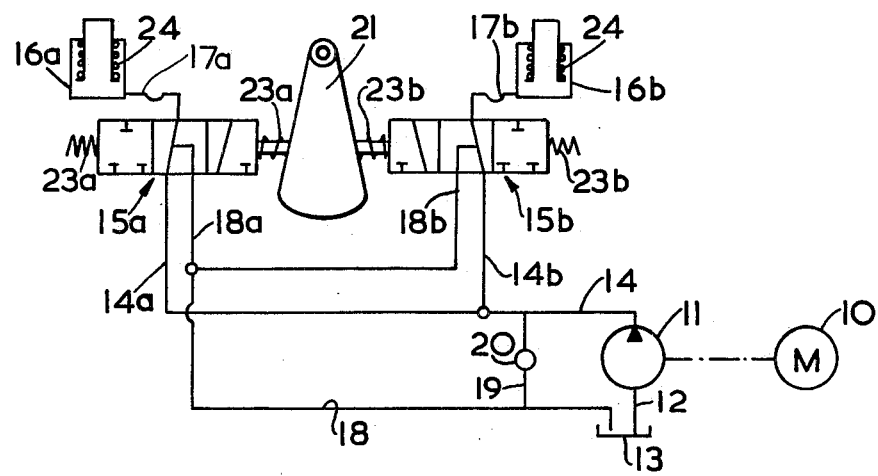
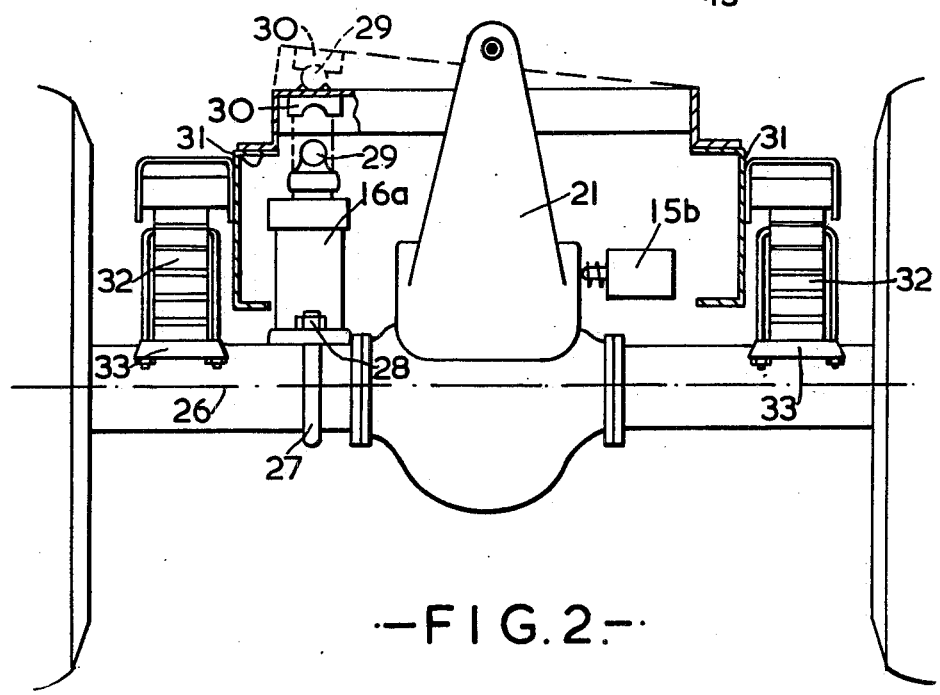

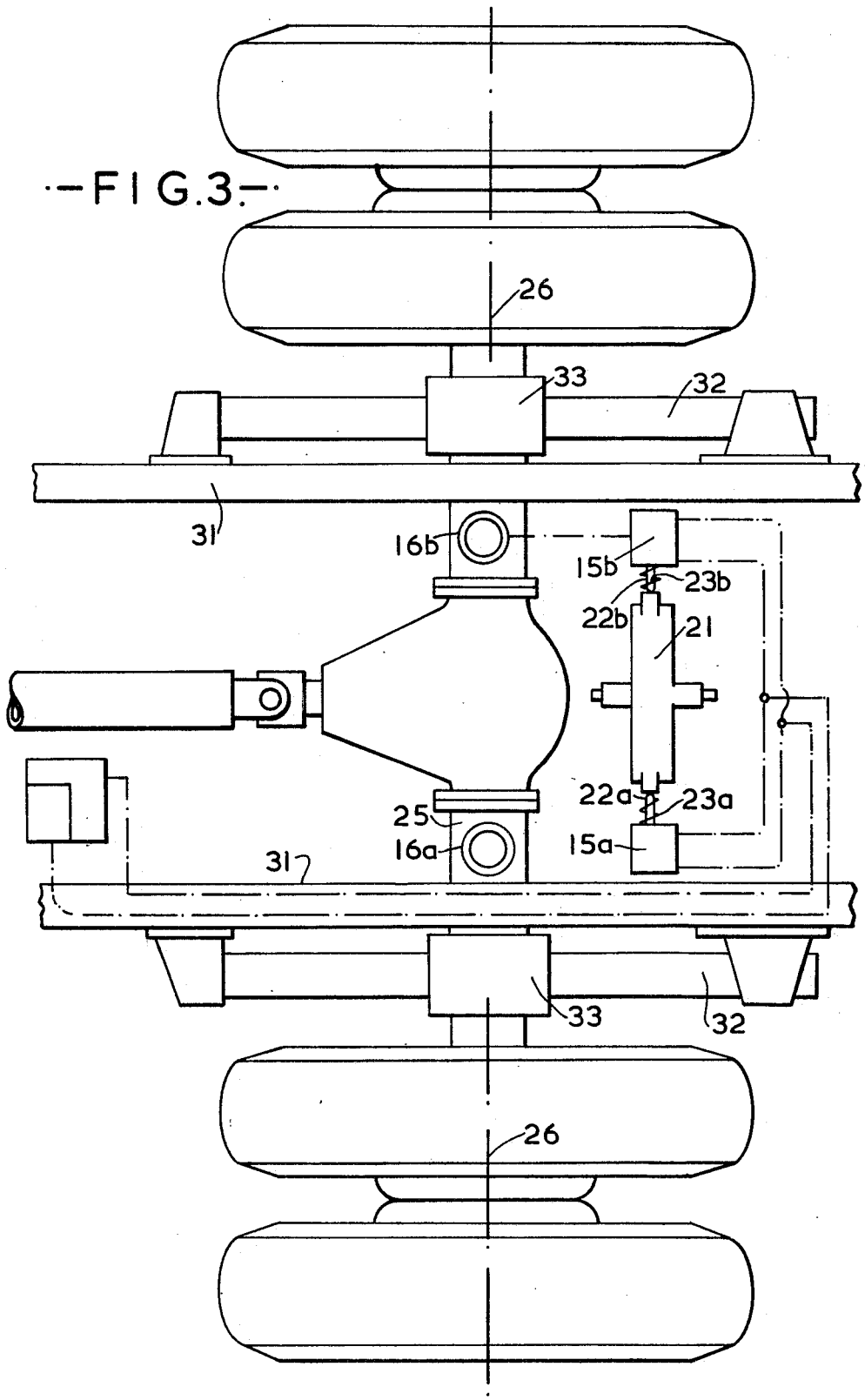

HYDRAULIC HEELING STABILIZERS

This invention relates to hydraulic heeling stabilisers for a vehicle.

A vehicle is known from German Patent Specification No. 818,734 in which two hydraulic pressure medium cylinders are controlled by means of an electrical circuit and the two cylinders are controlled at the same time so that when the one cylinder piston is pushed in the other is drawn out. There has not been proposed any form of springing of the vehicle in connection with the heeling stabiliser and springing does not appear to be possible either.

On the other hand, a pneumatic heeling stabiliser has been proposed in German Auslegeschrift No. 1,190,813 in which the heeling stabilisation and the springing is combined by means of a compressed air cylinder having a built-in pressure cushion. In practice, it has been found that such compressed air systems, if they are to be sufficiently reliable and effective in operation, are relatively expensive. Another disadvantage is that it is difficult to obtain sufficiently accurate control of the heeling stabiliser with compressed air to enable one to achieve effective compensation for the heeling or tilting which occurs and, at the same time, desired springing.

In German Auslegeschrift No. 1,254,482, there is proposed a construction having a hydraulic stabiliser in which the control force from the swinging pendulum is increased by means of a compression spring — and pressure medium — loaded pressure reinforcer. In the same way as in the first-mentioned known construction, one is dependent upon the piston of the one pressure medium cylinder being drawn out when the piston of the other cylinder is pushed in and no form of springing in connection with the heeling stabiliser is proposed.

With the present invention the aim is to provide a hydraulic heeling or tilting stabiliser in which the disadvantages of the afore-mentioned known constructions are avoided and in which springing of the vehicle can be achieved in a conventional manner and, nevertheless, an effective and accurately controlled heeling stabilisation obtained where there is a need for this.

According to the present invention a hydraulic heeling or tilting stabiliser for a vehicle comprises two individual pressure medium cylinders adapted to be mounted one on each side of a longitudinal central plane through said vehicle, valve means for controlling the supply of pressure medium to said cylinders and a swinging pendulum for actuating said valve means, said valve means being in the form of two separate control valves each associated with a respective one of the pressure medium cylinders and serving to couple said cylinders in parallel in a common pressure medium circuit, each control valve having pressure-loaded actuating means adapted to be actuated by pivoting the swinging pendulum, said cylinders being adapted for arrangement between a vehicle frame and a leaf spring-controlled wheel shaft to permit in the unactivated condition separate springing of the vehicle via respective leaf springs, activation of the one cylinder leaving the remaining cylinder unactivated and causing a portion of that one cylinder to form a support between said frame and said shaft.

In order that the invention can be more clearly understood, a convenient embodiment thereof will now be described, with reference to the accompanying drawings in which:

FIG. 1 is a hydraulic coupling diagram for a heeling or tilting stabiliser according to the invention.

FIG. 2 is an end view showing a vehicle chassis illustrating portions of the heeling stabiliser of FIG. 1, and FIG. 3 is a plan view showing portions of the vehicle chassis with the associated heeling stabiliser.

Referring to FIG. 1, there is illustrated a drive motor 10 which drives a hydraulic pump 11 which, via a first conduit 12, sucks hydraulic medium from a reservoir 13 and supplies the medium under pressure via a main pressure conduit 14 and branch pressure conduits 14a, 14b to valves 15a, 15b. The valves control their respective pressure medium cylinders 16a or 16b via respective work conduits 17a and 17b. From the valves, there extends a branch return conduit 18a or 18b via a main return conduit 18 to the reservoir 13.

Between the conduits 14 and 18 extends a side conduit 19 with back pressure valve 20.

Between the valves 15a, 15b, there is pivotably mounted about a horizontal axis a swinging pendulum 21. In the drawings, the swinging pendulum and the valves are shown in a normal and central position. Actuating means 22a or 22b of the valves are urged into abutment with the intermediate swinging pendulum 21 by means of respective springs 23a, 23b or their respective springs and the valves 15a, 15b are maintained in normal positions by means of two oppositely directed spring forces.

In the central position (normal position) of the valve, the work conduit 17a (17b) for the associated pressure medium cylinder 16a (16b) communicates via the valve 15a (15b) with the pressure conduit 14 and with the return conduit 18, that is to say the pressure conduit and the return conduit are, in this position, short circuited in the valve. The piston of the pressure medium cylinder is maintained by means of a compression spring 24 in place in a pushed-in bottom position against the medium pressure which prevails in the cylinder.

On swinging the pendulum 21 out from the central position in a direction to the left in FIG. 1, the actuating means 22a for the valve 15a is pushed to the left in FIG. 1 so that the conduit 17a only communicates with the pressure conduit via the valve 15a. The swinging of the pendulum 21 allows, furthermore, the actuating means 22b for the valve 15b to be pushed to the left by means of the force of the springs 23b so that both the pressure conduit 14b and the return conduit 18b are closed in the valve 15b. The pressure cylinder 16a will consequently be supplied with pressure medium until its piston is pushed out into the outer position. The piston of the pressure cylinder will thereafter be held in place in a pushed-out position so long as the pendulum 21 is maintained correspondingly outwardly pivoted, the pressure medium from the pump being discharged, as required, via the back pressure valve 20.

On swinging the pendulum 21 back to the normal position both the valves 15a and 15b are positioned back again. This involves the cylinder 16a reverting to the bottom position while the cylinder 16b continues to be held in the bottom position, that is to say both cylinders communicate freely both with the return conduit and with the pressure conduit.

On swinging the pendulum 21 from the initial position to the right in FIG. 1, there is obtained correspondingly a closing of the return conduit in the valve 15b and a closing of the return conduit and the pressure conduit in the valve 15a with, as a result of this, a displacement of the cylinder 16b to the pushed-out position.

In FIGS. 2 and 3, there is shown a constructional solution according to the invention in which the pressure medium cylinders 16a and 16b are secured to a guide sleeve 25 of a wheel shaft 26. The cylinders are secured by means of a U-shaped span member 27 having associated lock nuts 28. The piston of the cylinder is provided with a support portion 29 which projects axially upwards from the cylinder. In the illustrated bottom position for the piston of the cylinder, which is shown in full lines in FIG. 2, the support portion 29 is disposed at a level significantly below an associated stop 30 which is fixed to the underside of a vehicle frame 31. In the pushed-out position, as indicated by dotted lines in FIG. 2, the support portion is brought into abutment with the stop 30 and has lifted this a distance upwards relative to the wheel shaft so that there is obtained an oblique position of the vehicle frame with a heeling or tilting angle over to the right side in FIG. 2. The heeling or tilting angle will, in practice, vary with the weight loading from the load of the vehicle.

It is evident from FIGS. 2 and 3 that the frame of the vehicle is connected to the wheel shaft in a manner known per se with conventional leaf springs 32 which are arranged axially just within the wheels on one end of the wheel shaft and axially just outside an associated pressure medium cylinder 16a or 16b.

An especially current construction, which is not illustrated further in the drawings, can consist in fastening the pressure medium cylinders 16a, 16b in the same vertical plane as the leaf springs 32 and more particularly with the pressure medium cylinders fastened to fixing means 33 of the leaf springs on the wheel shaft 26.

When the vehicle is driven in a straight line it can be sprung in the usual way via the leaf springs 32. On heeling or tilting of the vehicle during driving on ground sloping in the transverse direction, the leaf springs on the heeling side will be put out of usual function since the weight loading from the vehicle is transferred to the support portion 29 of the pressure medium cylinder in the pushed-out position. On irregularities occurring in the ground there can be obtained a certain springing effect on the heeling side also since impact-like stresses on the pushed-out support portion 29 can be discharged via the back pressure valve 20. On that side of the wheel shaft which lies opposite the heeling or tilting side, conventional springing is assured via the associated leaf springs since the accompanying pressure medium cylinder is maintained in the bottom position and thereby permits free springing.

What I claim is:

1. In a hydraulic heeling stabiliser for a vehicle having a wheel shaft, a vehicle frame, and leaf springs mounted on the wheel shaft and having the vehicle frame supported thereon, said stabiliser comprising two individual pressure medium cylinders adapted to be mounted one on each side of a longitudinal central plane through said vehicle, valve means for controlling the supply of pressure medium to said cylinders and a swinging pendulum for actuating said valve means, the improvement which consists in said valve means being in the form of two separate control valves each associated with a respective one of the pressure medium cylinders and serving to couple said cylinders in parallel in a common pressure medium circuit, each control valve having pressure-loaded actuating means adapted to be actuated separately by pivoting the swinging pendulum, whereby only one control valve can be actuated at a time, said cylinders being adapted to extend between the vehicle frame and the wheel shaft to permit in the unactivated condition springing of the vehicle via respective leaf springs independently of the cylinders, activation of the one cylinder leaving the other cylinder unactivated and causing a portion of that one cylinder to form a support between said frame and said shaft.

2. The stabiliser of claim 1, wherein said pressure medium circuit comprises a pressure conduit and a return conduit which are interconnected via a back pressure valve, the latter permitting, on occurrence of an impact-like stress on the support portion of a given cylinder when that cylinder is pushed out in an activated condition, a springing effect in said cylinder with a pressure discharge via said back pressure valve.

3. The stabiliser of claim 1, wherein the swinging pendulum actuates said actuating means when travelling in a direction opposite to that of the pressure force exerted by said actuating means, the pressure force of said actuating means ensuring that said actuating means follows the movement of the swinging pendulum on its movement in the direction of movement of the pressure force.

4. A vehicle comprising a wheel shaft, a vehicle frame, leaf springs mounted on the wheel shaft and having the vehicle frame supported thereon, and a hydraulic heeling stabiliser which comprises two individual pressure medium cylinders mounted one on each side of a longitudinal central plane through said vehicle, valve means for controlling the supply of pressure medium to said cylinders and a swinging pendulum for actuating said valve means, said valve means being in the form of two separate control valves each associated with a respective one of the pressure medium cylinders and serving to couple said cylinders in parallel in a common pressure medium circuit, each control valve having pressure-loaded actuating means adapted to be actuated by pivoting the swinging pendulum, whereby only one control valve can be actuated at a time, said cylinders extending between the vehicle frame and the wheel shaft to permit in the unactivated condition springing of the vehicle via respective leaf springs independently of the cylinders, activation of the one cylinder leaving the other cylinder unactivated and causing a portion of that one cylinder to form a support between said frame and said shaft.

* * * * *